(12) United States Patent
Takahashi et al.

(10) Patent No.: US 11,054,245 B2
(45) Date of Patent: Jul. 6, 2021

(54) IMAGE PROCESSING APPARATUS, DEVICE CONTROL SYSTEM, IMAGING APPARATUS, IMAGE PROCESSING METHOD, AND RECORDING MEDIUM

(71) Applicant: Ricoh Company, Ltd., Tokyo (JP)

(72) Inventors: Sadao Takahashi, Kanagawa (JP);
Seiya Amano, Kanagawa (JP);
Hiroyoshi Sekiguchi, Kanagawa (JP);
Soichiro Yokota, Kanagawa (JP); Yuu Yamada, Kanagawa (JP); Shinichi Sumiyoshi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 276 days.

(21) Appl. No.: 16/122,425

(22) Filed: Sep. 5, 2018

(65) Prior Publication Data
US 2019/0003822 A1 Jan. 3, 2019

Related U.S. Application Data

(63) Continuation of application No. PCT/JP2016/087525, filed on Dec. 16, 2016.

(30) Foreign Application Priority Data

Mar. 10, 2016 (JP) .............................. JP2016-046975

(51) Int. Cl.
*G01B 11/00* (2006.01)
*G01C 3/06* (2006.01)
(Continued)

(52) U.S. Cl.
CPC ............ *G01B 11/002* (2013.01); *G01B 5/004* (2013.01); *G01B 11/00* (2013.01); *G01C 3/06* (2013.01);
(Continued)

(58) Field of Classification Search
CPC ...... G01B 11/00; G01B 11/002; G01B 5/004; G01C 3/06; G06K 9/00805; G06T 1/00; G06T 1/60; G06T 7/00; G08G 1/16
See application file for complete search history.

(56) References Cited

U.S. PATENT DOCUMENTS 7,787,712 B2    8/2010    Takahashi et al.
7,982,141 B2    7/2011    Takahashi et al.
(Continued)

FOREIGN PATENT DOCUMENTS

JP    H08-278126    10/1996
JP    2006-134035    5/2006
(Continued)

OTHER PUBLICATIONS

Extended European Search Report dated Jan. 4, 2019 in Patent Application No. 16893629.2, 8 pages.
(Continued)

*Primary Examiner* — Roy Y Yi
*Assistant Examiner* — Geoffrey T Evans
(74) *Attorney, Agent, or Firm* — Xsensus LLP

(57) ABSTRACT

An image processing apparatus includes processing circuitry configured to generate a first map formed of pixels that are associated with x coordinate information, distance information, and frequency values; search for a target pixel satisfying a predetermined condition among the pixels in the first map, the searching being performed from the pixels that are near towards the pixels that are far away as indicated by the distance information; and validate pixels surrounding the target pixel in the first map, together with the target pixel.

9 Claims, 11 Drawing Sheets

(51) Int. Cl.
    *G08G 1/16*     (2006.01)
    *G06T 1/00*     (2006.01)
    *G01B 5/004*     (2006.01)
    *G06T 1/60*     (2006.01)
    *G06K 9/00*     (2006.01)
    *G06T 7/00*     (2017.01)

(52) U.S. Cl.
    CPC ............ *G06K 9/00805* (2013.01); *G06T 1/00* (2013.01); *G06T 1/60* (2013.01); *G06T 7/00* (2013.01); *G08G 1/16* (2013.01)

(56) References Cited

U.S. PATENT DOCUMENTS

| | | |
|---|---|---|
| 8,570,334 B2 | 10/2013 | Sekiguchi et al. |
| 8,605,153 B2 | 12/2013 | Sasaki et al. |
| 8,950,872 B2 | 2/2015 | Hasegawa et al. |
| 9,330,320 B2 | 5/2016 | Takahashi et al. |
| 9,443,294 B2 | 9/2016 | Sumiyoshi |
| 2008/0100709 A1* | 5/2008 | Furukawa ................. G06T 7/12 348/169 |
| 2010/0226532 A1* | 9/2010 | Hayasaka ............ G06K 9/6203 382/103 |
| 2012/0242835 A1 | 9/2012 | Li et al. |
| 2013/0129150 A1 | 5/2013 | Saito |
| 2015/0049195 A1 | 2/2015 | Ishigaki et al. |
| 2015/0332103 A1 | 11/2015 | Yokota et al. |
| 2015/0334269 A1 | 11/2015 | Yokota et al. |
| 2015/0358610 A1 | 12/2015 | Takahashi et al. |
| 2016/0014406 A1 | 1/2016 | Takahashi et al. |
| 2016/0019429 A1 | 1/2016 | Ishigaki et al. |
| 2016/0131579 A1 | 5/2016 | Sekiguchi et al. |
| 2016/0301912 A1 | 10/2016 | Saitoh et al. |

FOREIGN PATENT DOCUMENTS

| | | |
|---|---|---|
| JP | 2013-109391 | 6/2013 |
| JP | 2015-179302 | 10/2015 |
| JP | 2015-207281 | 11/2015 |

OTHER PUBLICATIONS

Wu, M. et al. "Stereo based ROIs Generation for Detecting Pedestrians in Close Proximity" 2014 IEEE 17$^{th}$ International Conference on Intelligent Transportation Systems, XP032685662, 2014, pp. 1929-1934.

Wang, J. et al. "Motion Detection in Driving Environment Using U-V-Disparity" Computer Vision—ACCV 2006, Lecture Notes in Computer Science, vol. 3851, XP019027359, 2006, pp. 307-316.

International Search Report dated Mar. 7, 2017 in PCT/JP2016/087525 filed on Dec. 16, 2016.

* cited by examiner

CAPTURED IMAGE

CAPTURED IMAGE

U MAP (FREQUENCY)

IMAGE PROCESSING APPARATUS, DEVICE CONTROL SYSTEM, IMAGING APPARATUS, IMAGE PROCESSING METHOD, AND RECORDING MEDIUM

CROSS-REFERENCE TO RELATED APPLICATION

The present application is a continuation application of International Application No. PCT/JP2016/087525 filed on Dec. 16, 2016, which claims priority to Japanese Patent Application No. 2016-046975 filed on Mar. 10, 2016. The contents of these applications are incorporated herein by reference in their entirety.

BACKGROUND OF THE INVENTION

1. Field of the Invention

The present invention relates to an image processing apparatus, a device control system, an imaging apparatus, an image processing method, and a recording medium.

2. Description of the Related Art

With respect to the safety of automobiles, in the related art, the body structure of automobiles, etc., has been developed from the viewpoint of protecting pedestrians and passengers when colliding with pedestrians and automobiles. Furthermore, in recent years, with the development of the information processing technology and the image processing technology, techniques for detecting people and automobiles, etc., at high speed, have been developed. By applying these techniques, automobiles that automatically apply brakes before collision in order to prevent collision, are already on sale. In order to automatically apply brakes, there is a need to accurately measure the distance to a person or another vehicle, and in order to do so, measurement performed by using a millimeter wave radar, a laser radar, and a stereo camera, is put to practical use.

In the distance measurement by the stereo camera, in general, a disparity calculation process is executed based on two captured images on the left and the right, to generate a disparity image. By using a disparity value appearing in this disparity image, it is possible to measure distance information to a body appearing in the captured image. Also, by using the size of a disparity block in the disparity image, it is possible to detect the height and the width of the body, and the depth information of the body. Furthermore, it is also possible to grasp the position where a three-dimensional body exists, by the relationship between the disparity and coordinates.

With respect to distance measurement by a stereo camera, for example, Patent Literature 1 discloses a mobile body detection device including a stereo camera that captures an image of a scenery including a monitor region and outputs a pair of images in time series; a stereo image processing unit that calculates distance data by performing stereo matching based on the pair of images; and a recognizing unit that recognizes a three-dimensional body existing within the monitor region based on the distance data.

Patent Literature 1: Japanese Unexamined Patent Application Publication No. 2006-134035

SUMMARY OF THE INVENTION

An aspect of the present invention provides an image processing apparatus, a device control system, an imaging apparatus, an image processing method, and a recording medium, in which one or more of the disadvantages of the related art are reduced.

According to one aspect of the present invention, there is provided an image processing apparatus including processing circuitry configured to generate a first map formed of pixels that are associated with x coordinate information, distance information, and frequency values; search for a target pixel satisfying a predetermined condition among the pixels in the first map, the searching being performed from the pixels that are near towards the pixels that are far away as indicated by the distance information; and validate pixels surrounding the target pixel in the first map, together with the target pixel.

DETAILED DESCRIPTION OF THE PREFERRED EMBODIMENTS

Figure 1:
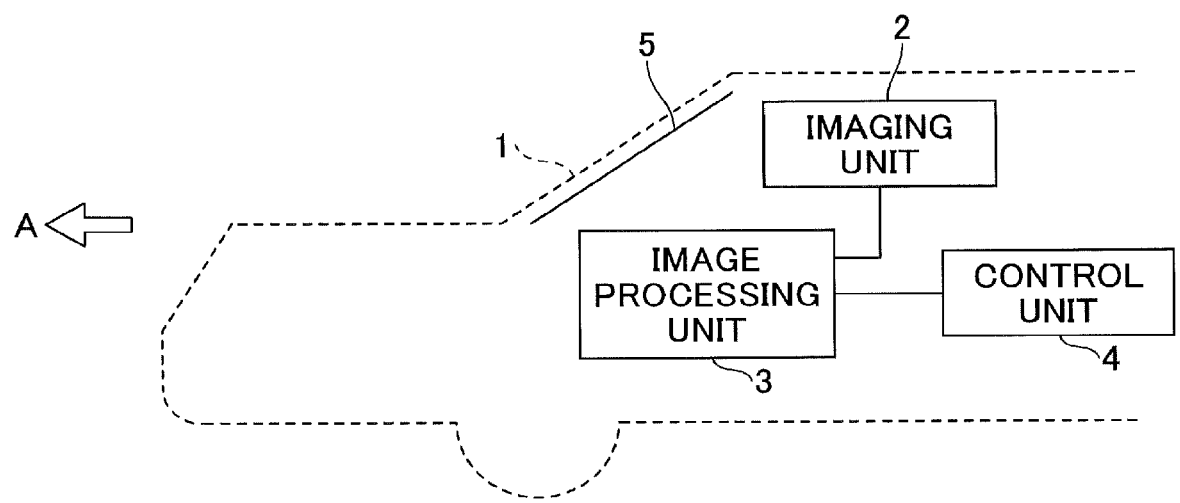
FIG. 1 is a schematic configuration diagram of a device control system according to an embodiment of the present invention.

A problem to be solved by an embodiment of the present invention is to increase the processing speed with respect to the recognition of an object, and to reduce erroneous recognitions of objects.

An image processing apparatus according to an embodiment of the present invention will be described below with reference to the drawings; however, the image processing apparatus is not limited to the present embodiment at all, as long as the gist of the present invention is not exceeded. Note that in the drawings, the same or corresponding parts are denoted by the same reference numerals, and redundant descriptions thereof will be simplified or omitted as appropriate. Furthermore, the embodiments described below are the best mode of the present invention and do not limit the scope of the claims according to the present invention.

In the present embodiment, an example in which the image processing apparatus recognizes a body such as another vehicle travelling in front of the vehicle, captured by an imaging apparatus such as a stereo camera, etc., attached to the vehicle that is a mobile body, will be described. The mobile body is not limited to a vehicle, and the present invention may be applied to a ship or an aircraft, etc.

Then, for example, the processing result obtained by the image processing apparatus is used to control the travelling, etc., of the vehicle. Note that in addition to the concept of controlling the vehicle itself, etc., the control here also includes the concept of controlling predetermined devices provided in the vehicle, etc., such as the units including a brake system, a steering system, and an engine control system, etc.

Furthermore, the image processing apparatus may be configured singly, for example, as an information processing apparatus, etc., or may be configured such that processing functions included in the image processing apparatus are incorporated in a processing board, etc., included in an imaging apparatus such as a stereo camera.

<Device Control System According to Present Embodiment>

A device control system according to the present embodiment will be described with reference to FIG. 1. Here, an outline of the device control system will be described, by taking a system for controlling a vehicle that is a device, as an example. It is assumed that the direction of an arrow A is the front nose of a vehicle 1. The vehicle 1 includes an imaging unit 2, an image processing unit 3, and a control unit 4. For example, the imaging unit 2 is installed near a rear-view mirror in the interior of the vehicle, and captures images of another vehicle, etc., traveling in front of the vehicle 1, through a windshield 5.

Based on an image captured by the imaging unit 2, the image processing unit 3 recognizes a body, and the recognition result is used by the control unit 4 to control the traveling speed of the vehicle, the traveling interval between another vehicle, the traveling lane, and the timing of applying the brakes, etc. Note that the terms imaging unit, image processing unit, and control unit are applied for the sake of convenience in order to distinguish these description contents from other description contents, and there is no other meaning in applying the names of the units. That is, the imaging unit, the image processing unit, and the control unit may be referred to as an imaging apparatus or an imaging means, an image processing apparatus or an image processing means, and a control apparatus or a control means, respectively.

<Imaging Apparatus According to Present Embodiment>

Figure 2:
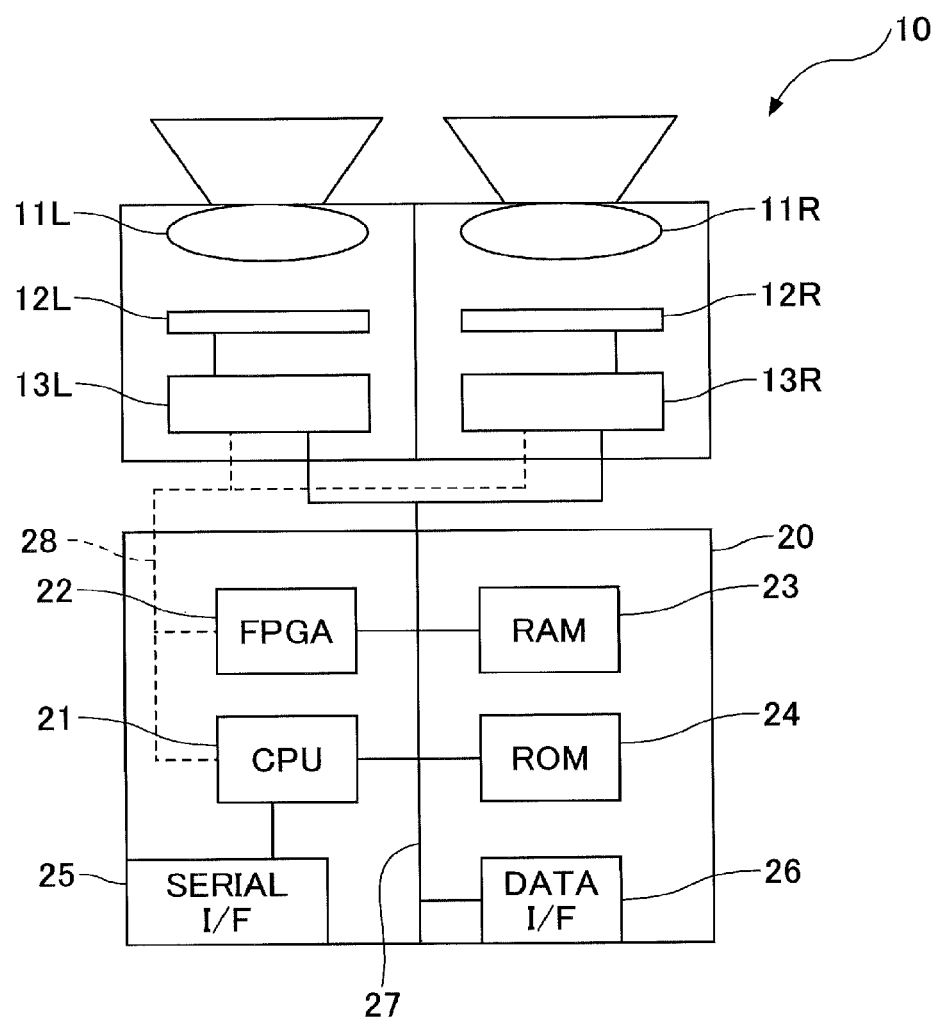
FIG. 2 is a schematic configuration diagram of an imaging apparatus according to an embodiment of the present invention.

An imaging apparatus according to the present embodiment will be described with reference to FIG. 2. The imaging apparatus according to the present embodiment includes a stereo camera 10 and an image processing board 20.

The stereo camera 10 is formed by assembling two cameras in parallel. The stereo camera 10 includes an image sensor 12L and an image sensor controller 13L, and an image sensor 12R and an image sensor controller 13R, corresponding to a left lens 11L and a right lens 11R, respectively. Note that in the present embodiment, the stereo camera 10 is formed of two cameras; however, the present invention does not hinder the stereo camera 10 from being formed of three or more cameras.

The image sensor controllers 13L and 13R have the functions of exposure control of the image sensors 12L and 12R, A/D conversion, image reading control, communication with external circuits, and transmission of image data. The stereo camera 10 is connected to the image processing board 20 via a data bus 27 and a serial bus 28. The stereo camera 10 outputs luminance image data and disparity image data.

The luminance image data output from the stereo camera 10 is transferred from the image sensors 12L and 12R to the image processing board 20 via the data bus 27. Furthermore, the serial bus 28 performs transmitting and receiving of changes in the sensor exposure control value, changes in the image reading parameter, and of various setting data, from the image processing board 20.

The image processing board 20 includes a central processing unit (CPU) 21, a field-programmable gate array (FPGA) 22, a random access memory (RAM) 23, a read-only memory (ROM) 24, a serial interface (I/F) 25, a data I/F 26, the data bus 27, and the serial bus 28.

The CPU 21 executes operation control of the entire image processing board 20, image processing, and image recognition processing. The FPGA 22 executes processes demanded to be performed in a real-time manner, with respect to the image data stored in the RAM 23. The FPGA 22 executes, for example, gamma correction, distortion correction (that is, parallelization of left and right captured images), and disparity calculation by block matching to generate a disparity image, and writes the disparity image in the RAM 23.

The CPU 21 has a function of controlling the image sensor controllers 13L and 13R of the stereo camera 10 and controlling the entire image processing board 20. Furthermore, the CPU 21 loads programs for executing road surface shape detection, guard rail detection, and object detection from the ROM 24, and executes various processes by inputting a luminance image and a disparity image stored in the RAM 23. Furthermore, the CPU 21 outputs detected data from the serial I/F 25 or the data I/F 26 to the outside.

When executing processes, the CPU 21 uses the data I/F 26 to input vehicle information such as the vehicle speed, the acceleration, the steering angle, and the yaw rate, etc., and uses the information as parameters of various processes such as road surface shape detection. Data to be output to the outside is used as input data for executing vehicle control such as automatic emergency braking and automatic speed control. Note that some of the functions implemented by the CPU 21 and the FPGA 22 may be provided outside the image processing board 20.

<Functional Blocks of Image Processing Apparatus According to Present Embodiment>

Figure 3:
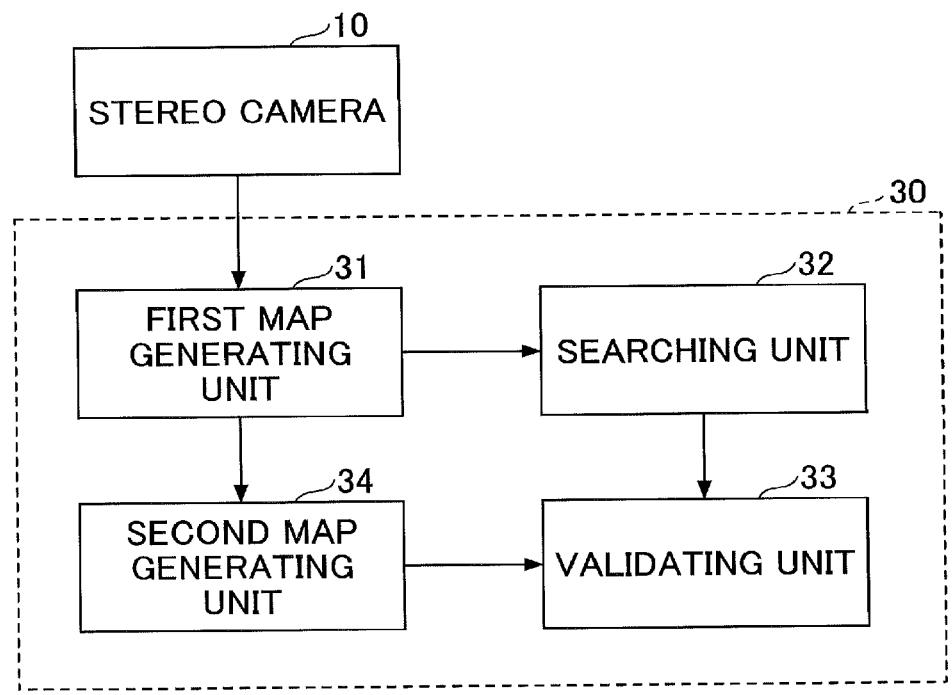
FIG. 3 is a functional block diagram of an image processing apparatus according to an embodiment of the present invention.

Functional blocks of the image processing apparatus according to the present embodiment will be described with reference to FIG. 3. As illustrated in FIG. 3, an image processing apparatus 30 according to the present embodiment includes a first map generating unit 31, a searching unit 32, a validating unit 33, and a second map generating unit 34.

As a premise of the description of the functional blocks according to the present embodiment, a process performed by the image processing apparatus 30 of generating a disparity image from captured images captured by the stereo camera 10, which is formed of two cameras that are two imaging units, will be described. The function of the present process is implemented by the FPGA 22 illustrated in FIG. 2.

More specifically, in order to obtain a disparity image from the luminance image data acquired from the stereo camera 10, the image processing apparatus 30 calculates the disparity value of the corresponding image portions between the captured images captured by the stereo camera 10.

The disparity value referred to here is a value obtained by taking one of the captured images captured by the stereo camera 10 as a reference image and the other one of the captured images as a comparison image, and calculating a positional deviation amount of an image portion in the comparison image with respect to an image portion in the reference image corresponding to the same point in the imaging region, as the disparity value of the image portions. Then, by using the principle of triangulation, it is possible to calculate the distance to the same point in the imaging region corresponding to the image portions, based on this disparity value. Note that the disparity value and the distance value can be handled equivalently, and therefore in the present embodiment, the disparity image is used as an example of the distance image, and the disparity information is used as an example of the distance information.

The stereo camera 10 outputs luminance image data as a captured image. In this case, when the stereo camera 10 is a color camera, color luminance conversion for obtaining a luminance signal (Y) from the RGB signals is performed. For example, the luminance signal is obtained by the following formula [1].

$$Y = 0.3R + 0.59G + 0.11B \quad \text{formula [1]}$$

Note that the image processing apparatus 30 performs a parallelized image generation process on the luminance image data acquired from the stereo camera 10. In this parallelized image generation process, stereo camera images output from the respective cameras are converted into ideal parallelized stereo camera images, which would be obtained if the two cameras were assembled in a parallel manner, based on the distortion of the optical system of the two cameras forming the stereo camera 10 and the relative positional relationship between the left and right cameras.

After performing the parallelized image generation process in this way, the image processing apparatus 30 performs the disparity image generation process for generating the disparity image data. In the disparity image generation process, first, the luminance image data acquired from one of the two cameras is set as the reference image data, and the luminance image data acquired from the other camera is set as the comparison image data. Then, the image processing apparatus 30 uses these pieces of image data to calculate the disparity of both of these pieces of image data, generates disparity image data, and outputs disparity image data. This disparity image data indicates a disparity image in which pixel values corresponding to disparity values d calculated for the respective image portions in the reference image data, are expressed as pixel values of the respective image portions.

Specifically, the image processing apparatus 30 defines a block formed of a plurality of pixels (for example, 16 pixels×1 pixel) centered on one target pixel for a certain row of the reference image data. On the other hand, in the same row in the comparison image data, the block having the same size as the block defined in the reference image data, is shifted pixel by pixel in the lateral line direction by the image processing apparatus 30. Then, the image processing apparatus 30 calculates a correlation value indicating the correlation between the feature amount indicating the feature of the pixel value of the block defined in the reference image data and the feature amount indicating the feature of the pixel value of each of the blocks in the comparison image data.

Then, based on the calculated correlation values, the image processing apparatus 30 performs a matching process to select a block of the comparison image data having the highest correlation with the block of the reference image data, among the blocks in the comparison image data. Subsequently, the image processing apparatus 30 calculates, as the disparity value d, the positional deviation amount between the target pixel of the block of the reference image data and the corresponding pixel of the block of the comparison image data selected by the matching process. By performing such a process of calculating the disparity value d on the whole area or a specific area of the reference image data, the disparity image data can be obtained.

For example, as the feature amount of the block used for the matching process, the value of each pixel (luminance value) in the block can be used. Furthermore, as the correlation value, for example, the total sum of the absolute values indicating the difference between the value of each pixel (luminance value) in the block of reference image data and the value of each pixel (luminance value) in the block of the comparison image data corresponding to each of the pixels of the reference image data, can be used. In this case, it can be said that the block having the smallest total sum has the highest correlation.

In the case where the matching process in the image processing apparatus 30 is implemented by hardware processing, for example, methods such as Sum of Squared Difference (SSD), Zero-mean Sum of Squared Difference (ZSSD), Sum of Absolute Difference (SAD), and Zero-mean Sum of Absolute Difference (ZSAD), etc., can be used.

Note that in the matching process, only disparity values in units of pixels can be calculated, and therefore if a disparity value of a sub pixel level that is less than one pixel is required, it is necessary to use an estimated value. As an estimation method thereof, for example, an equiangular straight line method and a quadratic curve method, etc., can be used. However, an error occurs in the estimated disparity value at the subpixel level, and therefore estimation error correction (EEC), etc., for reducing this estimation error, may be used.

The first map generating unit 31 is a map generating means for generating a first map formed of pixels that include x coordinate information and distance information and that are associated with frequency values, from a distance image formed of pixels that include x, y coordinate information and that hold distance information. The function of the first map generating unit 31 is implemented by the CPU 21 illustrated in FIG. 2. In the present embodiment, the "first map" corresponds to a U map; however, this is merely a name for distinguishing the first map from a "second map" described later, as a matter of convenience.

Furthermore, the first map generating unit 31 generates a V map to generate the first map. Furthermore, the first map generating unit 31 generates a second map from the first map, by converting the x axis direction of the first map into an actual distance. In the present embodiment, the "second map" corresponds to a real U map; however, this is merely a name for distinguishing the second map from the aforementioned "first map", as a matter of convenience. Note that in the present embodiment, it is described that a plurality of maps is created in order from one another; however, the present invention is not limited as such. For example, the second map may be directly generated from the two captured images obtained by the two imaging means.

The V map generation process by the first map generating unit 31 will be described with reference to FIGS. 4A and 4B. The first map generating unit 31 generates a V map based on the generated disparity image. Generation of the V map is performed in order to estimate a road surface position in the disparity image, and recognize a body present on the road surface. By identifying the road surface position, information of the height from the road surface can be obtained, and the size of the body present on the road surface can be identified.

Each piece of disparity pixel data included in the disparity image data is indicated by a set (x, y, d) of the x direction position, the y direction position, and the disparity value d. The first map generating unit 31 generates a two-dimensional histogram, by setting d on the X axis, y on the Y axis, and the frequency on the Z axis, among the elements of this set (x, y, d). This two-dimensional histogram corresponds to the V map. That is, the first map generating unit 31 counts up the frequency by 1 for each pixel of the disparity image, when (d, y) is held.

Figure 4A:
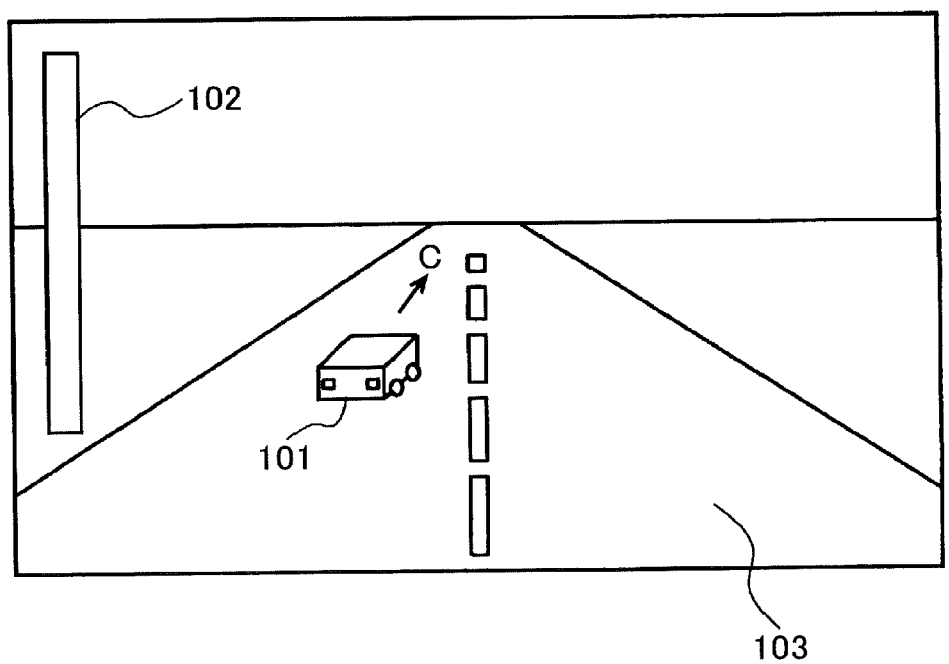
FIG. 4A is a schematic diagram for describing a V map generation process according to an embodiment of the present invention.
Figure 4B:
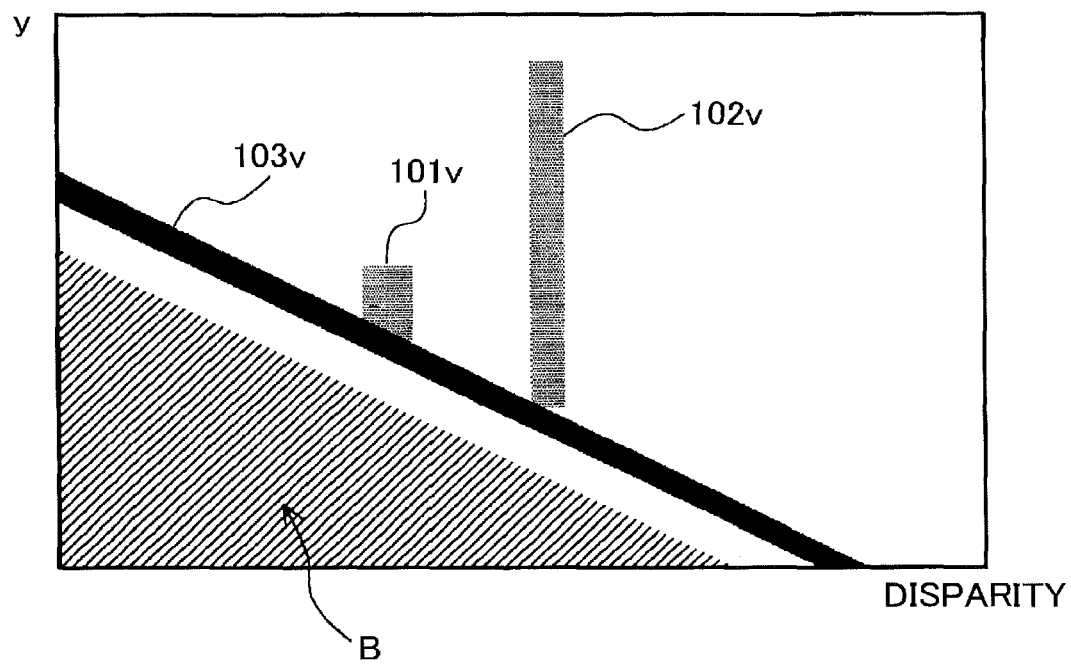
FIG. 4B is a schematic diagram for describing a V map generation process according to an embodiment of the present invention.

FIG. 4A is a captured image obtained by capturing a state in which a vehicle 101 is traveling in the direction of the arrow C on a road surface 103, and a utility pole 102 exists on the left side of the road surface 103. A V map generated by the first map generating unit 31 based on the captured image of FIG. 4A, is illustrated in FIG. 4B. As illustrated in FIG. 4B, when converting a disparity image into a V map, the disparity values at a certain height from the road surface are clustered in association with each other in the V map, so that a body on the road surface can be recognized. By performing the clustering, it is possible to recognize a vehicle 101v, a utility pole 102v, and a road surface 103v in the V map.

Furthermore, it is necessary to set a region (hereinafter referred to as "voting region") where the disparity values are associated in the V map. In FIG. 4B according to the present embodiment, a region B indicated by slanted lines is a portion below the road surface 103. No disparity is detected in the portion below the road surface 103, and therefore the disparity values are not associated with each other in the B region. In addition, it is preferable to determine the voting region in consideration of the changes in the estimated road surface range, etc., depending on the traveling state of the vehicle in which the camera is installed.

Furthermore, the first map generating unit 31 performs a road surface shape detecting process for detecting the shape of the road surface 103. This is a process of linearly approximating the position estimated as the road surface in the V map. As a method of linear approximation, for example, a least squares method or Hough transformation may be used. For example, when the road surface is flat, the position can be approximated by one straight line; however, if the gradient changes in the middle of the road, it is necessary to divide the map into sections to accurately perform linear approximation.

Note that when the road surface shape detection process is performed in the V map, the voting region may be restricted as described above, or the road surface shape detection may be performed by dividing the region into two regions, namely a large disparity region and a small disparity region.

The first map generating unit 31 performs a road surface height table calculation process of calculating the height of the road surface 103 and tabulating the calculated height. A linear expression representing the road surface is obtained from the V map, and if the disparity d is determined, then the y coordinate at that time is determined. This y coordinate is the height of the road surface, and this is tabulated in the range of the necessary disparity.

Next, the outline of the U map generation process by the first map generating unit 31 will be described with reference to FIGS. 5A to 5C. The first map generating unit 31 generates a U map to estimate the existence of, for example, a guardrail or a standing wall, etc., along a road surface. The first map generating unit 31 sets the set (x, y, d) of the x direction position, the y direction position, and the disparity value d in each piece of disparity pixel data included in the disparity image data, such that x is set on the X axis, d is set on the Y axis, and the frequency is set on the Z axis, to generate two-dimensional histogram information of X-Y. The two-dimensional histogram information is the U map.

In the present embodiment, the first map generating unit 31 generates a frequency U map with respect to points (x, y, d) in the disparity image in a range of a predetermined height from the road surface (for example, 20 cm to 3 m), based on the height of each road surface portion tabulated in the road surface height table described above.

Figure 5A:
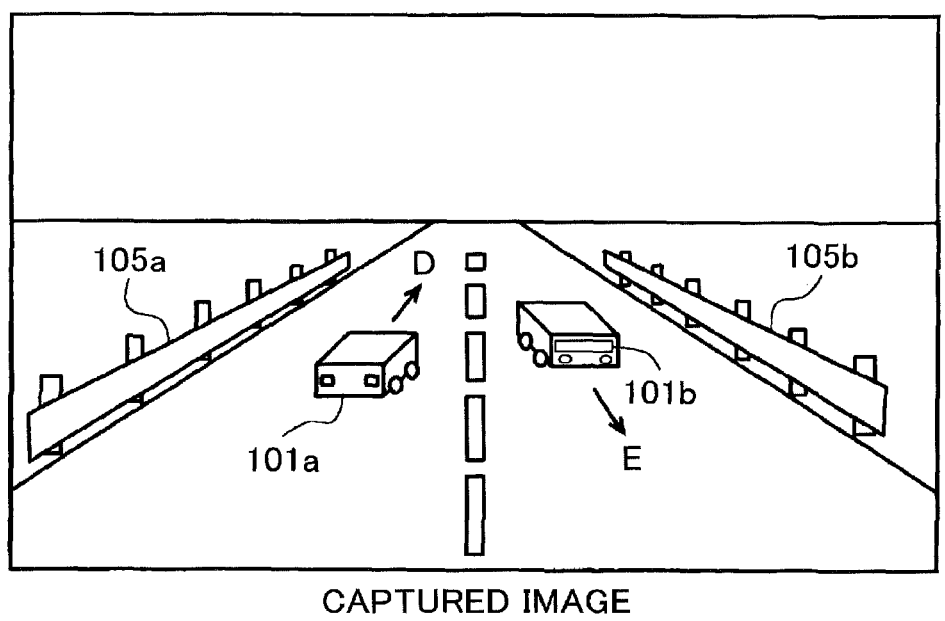
FIG. 5A is a schematic diagram for describing a U map generation process according to an embodiment of the present invention.

FIG. 5A is a captured image of a state in which a vehicle 101a travels in the direction of the arrow D on the left lane, and a vehicle 101b travels in the direction of the arrow E on the right lane, on a road having one lane on each side. Furthermore, guard rails 105a and 105b are set on both sides of the road.

Figure 5B:
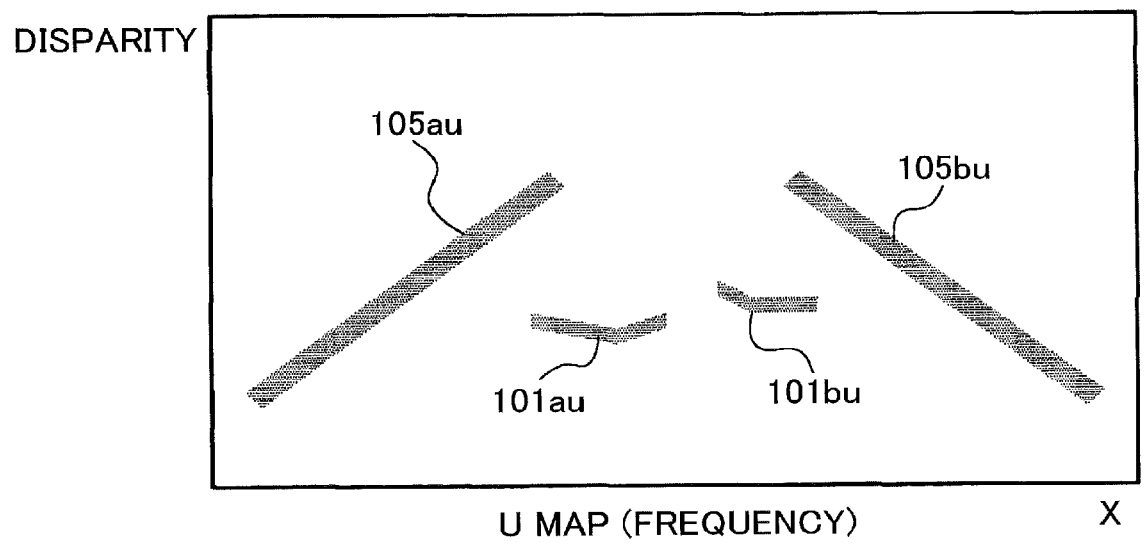
FIG. 5B is a schematic diagram for describing a U map generation process according to an embodiment of the present invention.

FIG. 5B is a diagram illustrating a frequency U map converted from the captured image illustrated in FIG. 5A. The guard rails 105a and 105b are the straight lines extending from the left and right ends to the center upper part. Here, the guard rails 105a and 105b after the U map conversion are denoted as 105au and 105bu, respectively.

On the other hand, the vehicle 101a and the vehicle 101b have a shape including a horizontal line segment and an oblique line connected to the horizontal line segment when the side of the car is visible and disparity is detected, between the guard rails 105au and 105bu. Here, the vehicles 101a and 101b after the U map conversion are denoted as 101au and 101bu, respectively.

Figure 5C:
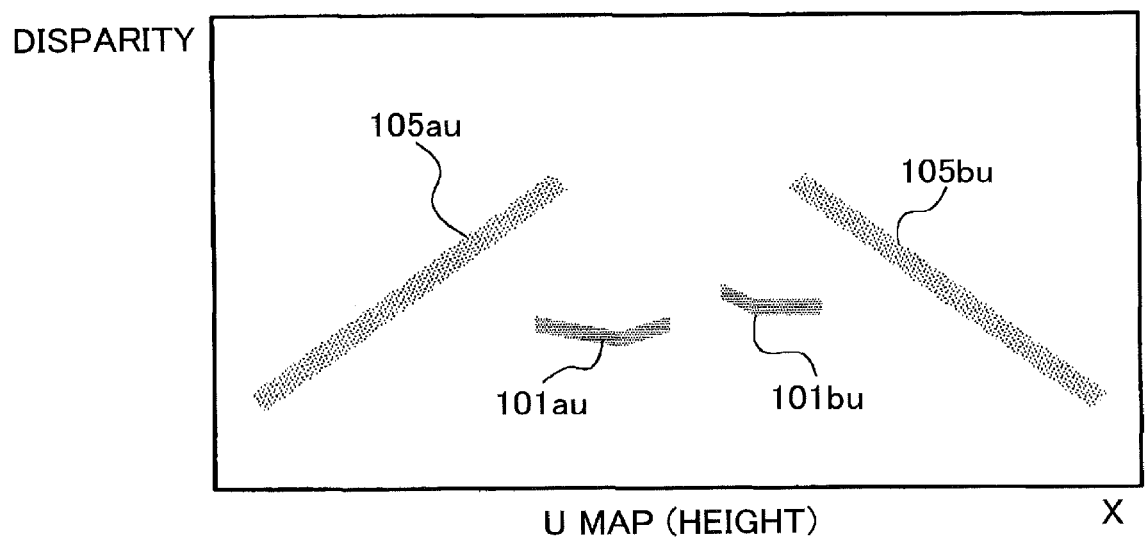
FIG. 5C is a schematic diagram for describing a U map generation process according to an embodiment of the present invention.

FIG. 5C is a diagram illustrating a height U map. The first map generating unit 31 generates a height U map simultaneously with the generation of the frequency U map. The first map generating unit 31 sets the set (x, y, d) of the x direction position, the y direction position, and the disparity value d, in each piece of disparity pixel data included in the disparity image data, such that x is set on the X axis, d is set on the Y axis, and the height from the road surface is set on the Z axis, to generate two-dimensional histogram information of X-Y. The two-dimensional histogram information is the height U map. The value of the height at this time is the highest from the road surface.

In FIG. 5C, as indicated by the difference in darkness of the hatching, the hatching of the vehicles 101*au* and 101*bu* is darker than that of the guard rails 105*au* and 105*bu*, and the height of the vehicles 101*au* and 101*bu* is higher than the height of the guard rails 105*au* and 105*bu*. Accordingly, the height information of a body can be used for body recognition.

Figure 6A:
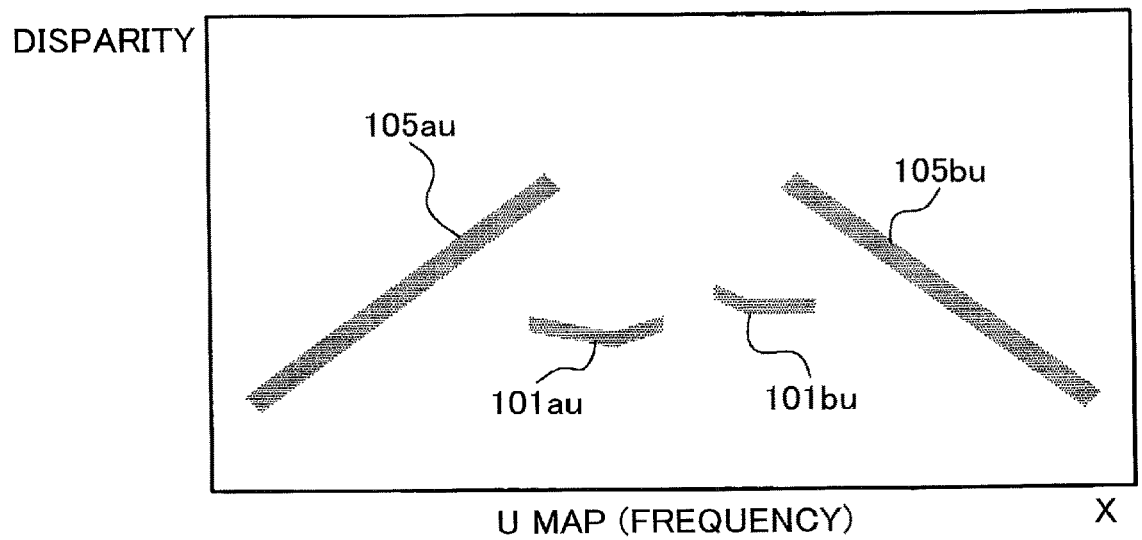
FIG. 6A is a schematic diagram for describing a real U map generation process according to an embodiment of the present invention.

The second map generating unit 34 is a second map generating means that generates a real U map obtained by converting the x axis direction of the U map into an actual distance. The real U map generation process will be described with reference to FIGS. 6A and 6B. The real U map is obtained by converting the lateral axis of the U map described above from the pixel unit of the image to an actual distance unit, and converting the disparity value on the vertical axis into a thinned disparity to which a thinning rate according to the distance is applied. Note that FIG. 6A is the same as FIG. 5B. Here, an example in which the lateral axis is converted to an actual distance is illustrated; however, it is sufficient to convert the lateral axis to a unit corresponding to the actual distance.

The thinned disparity on the vertical axis is not thinned with respect to a long distance (here, 50 m or more), but is thinned to ½ with respect to a medium distance (20 m or more, less than 50 m), thinned to ⅓ with respect to a short distance (10 m or more, less than 20 m), and thinned to ⅛ with respect to a very close range (less than 10 m).

That is, the larger the distance, the smaller the amount of thinning. The reason is that a body appears small in size at a faraway location, and therefore there is less disparity data, and the distance resolution is also low, and accordingly, the thinning is reduced. Conversely, the body appears large in size at a short distance, and therefore there is more disparity data, and the distance resolution is high, and accordingly, thinning is increased.

Figure 6B:
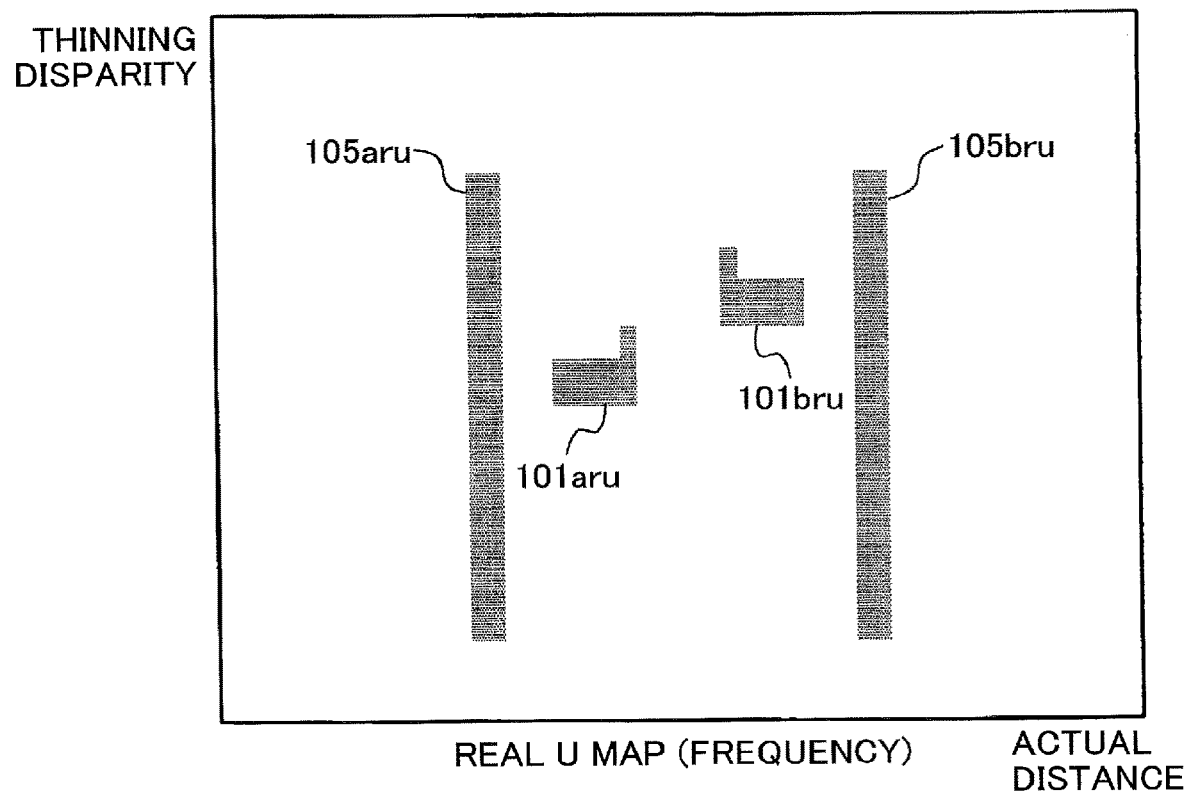
FIG. 6B is a schematic diagram for describing a real U map generation process according to an embodiment of the present invention.

FIG. 6B is an example of the real U map generated by the second map generating unit 34. This figure is an overhead view of looking down at the road surface and the vehicles, etc., traveling on the road surface from above. The guard rails 105*au* and 105*bu* are represented by vertical lines, and the guard rails 105*au* and 105*bu* after conversion are denoted by 105*aru* and 105*bru*, respectively. Furthermore, the shapes of the vehicles 101*au* and 101*bu* are also converted to those close to the actual shapes. The vehicles 101*au* and 101*bu* after conversion are denoted by 101*aru* and 101*bru*, respectively.

Note that similar to FIG. 5C, not only the frequency map but also the height real U map can be generated for the real U map.

The searching unit 32 is a searching means that searches for a target pixel that is a pixel satisfying a predetermined condition in the U map. The predetermined condition is, for example, a condition that the height information held by the searched pixel is greater than or equal to a predetermined threshold value, and the pixel density of the surrounding region including the searched pixel is greater than or equal to a predetermined density threshold value.

Specifically, it is preferable to perform a masking process on a predetermined range including the searched pixel, and when the number of pixels in the same mask is greater than or equal to a predetermined threshold value, the searched pixel is used as the target pixel. For example, when a mask of 5×5 pixels is set in a surrounding pixel region including the searched pixel, and there are 6 pixels or more in the same mask, the searched pixel may be set as the target pixel. Furthermore, the condition is not limited to the case where the number of present pixels is greater than or equal to a predetermined threshold value; when a plurality of pixels occupies a region larger than or equal to a predetermined ratio in the same mask, the searched pixel may be used as the target pixel. For example, when a plurality of pixels occupies a region of 50% or more in the mask including the searched pixel, the searched pixel may be set as the target pixel.

Furthermore, in the present embodiment, the searching unit 32 searches for the target pixel from the side closer to the stereo camera 10 towards the far side along the y axis direction of the U map. The target pixel is searched from the side closer to the stereo camera, because in the present embodiment, it is desired to capture a pixel that is close to the imaging viewpoint of a stereo camera, etc., as the target pixel. Whether or not the target pixel is on the side closer to the stereo camera, can be determined by the distance information held by the pixel. Then, in order to determine a pixel whose distance is close to the imaging viewpoint of the stereo camera as the target pixel, the above distance threshold value, etc., may be used.

Furthermore, in the present embodiment, the searching unit 32 sets pixels on a side further away from the searched pixel, as non-search targets, for each pixel row in the U map. That is, when the target pixel is found in a certain pixel row, the searching unit 32 does not further search for pixels in this pixel row, but searches for pixels in the next pixel row. Accordingly, in the pixel row that is the search target, no more pixels are searched for beyond the target pixel that has been found, and therefore the time taken for the pixel search can be reduced. Accordingly, the processing speed can be increased. As an example of actual processing, when the distance information held by the target pixel exceeds the above distance threshold value, the pixel may be set as a non-search target, etc.

The validating unit 33 is a validating means for validating a pixel positioned in the surroundings of the target pixel in the U map, together with the target pixel. In the present embodiment, "validation" means adopting or determining, etc., the pixel searched by the searching unit 32, as a pixel for recognizing an object.

According to the present embodiment, the validation process is performed on the target pixel that has been found for each pixel row by the searching unit 32, and pixels further away from the target pixel that has been found, are not searched as described above, and are thus not validated. In the related art, pixels corresponding to a body that is not an object of recognition and mismatching pixels have been the targets of processing; however, in the present embodiment, processing for such pixels is omitted, and therefore the processing speed is increased and erroneous recognitions of objects can be reduced.

Furthermore, the validating unit 33 validates pixels positioned within a first range in the y axis direction from the target pixel that has been found by the searching unit 32. This is because, in order to recognize an object, it is preferable to validate the pixels as a pixel block corresponding to the size of the object.

Furthermore, the validating unit 33 changes the first range according to the distance information of the target pixel. For example, the pixel region corresponding to m % of the distance of the target pixel, in a short distance region from the imaging viewpoint to a certain distance, may be set as the validation range. Conversely, a pixel region corresponding to 2 m % of the distance of the target pixel, in a long distance region far away from the imaging viewpoint exceeding the above certain distance, may be set as the validation range. In the long distance region, pixels tend to stretch due to the distribution of the disparity, and therefore it is preferable to set a region longer than the short distance region as the validation range.

On the other hand, the validating unit 33 can validate the target pixel converted onto the real U map, in the real U map. In this case, the validating unit 33 validates the pixels positioned within a second range in the x axis direction from the target pixel converted onto the real U map. The validating unit 33 can also increase the second range when the distance information of the target pixel is small. For example, a pixel region corresponding to 2n % of the width of the target pixel, in the short distance area from the imaging viewpoint to a certain distance, may be set as the validation range. On the other hand, a pixel region corresponding to n % of the width of the target pixel in the long distance region far away from the imaging viewpoint exceeding the above certain distance, may be set as the validation range. Note that pixels surrounding the target pixel may be validated as additional pixels. In the short distance region, the body appears to be enlarged, and therefore there are many pieces of disparity data and the distance resolution is high. There is a tendency that the disparity becomes subject to variability in the short distance region, and therefore it is preferable to make the validation range in the short distance region to be larger than the validation range in the long distance region.

As described above, it is preferable that the validating unit 33 validates the converted pixels, which are obtained by converting the pixels found in the U map by the searching unit 32 into the real U map. Note that that this does not prevent validating the pixels found in the U map, in the U map.

On the other hand, when the pixels found in the U map are validated in the U map and then the validated pixels are converted onto a real U map, distortion may occur in the validated pixel block in the real U map, and the conversion process may take time. Therefore, by using the pixels found in the U map as target pixels and converting these pixels into a real U map, and then performing a validation process on the converted pixels, the processing accuracy can be improved and the processing time can be reduced.

Note that after the validating unit 33 validates the target pixel, the image processing apparatus 30 performs a process of recognizing an object. It is possible to determine the range to be recognized in the disparity image, from the position, the width, and the minimum disparity of the pixel block validated in the real U map. In the present embodiment, as described above, the target pixel is validated, and non-search pixels other than the target pixel are not validated. Therefore, in the recognition range determined from the pixel block, etc., that has been validated, there is no factor that lowers the recognition accuracy, and as a result, erroneous recognitions can be reduced.

<Specific Examples of Image Processing According to Present Embodiment>

Figure 10A:
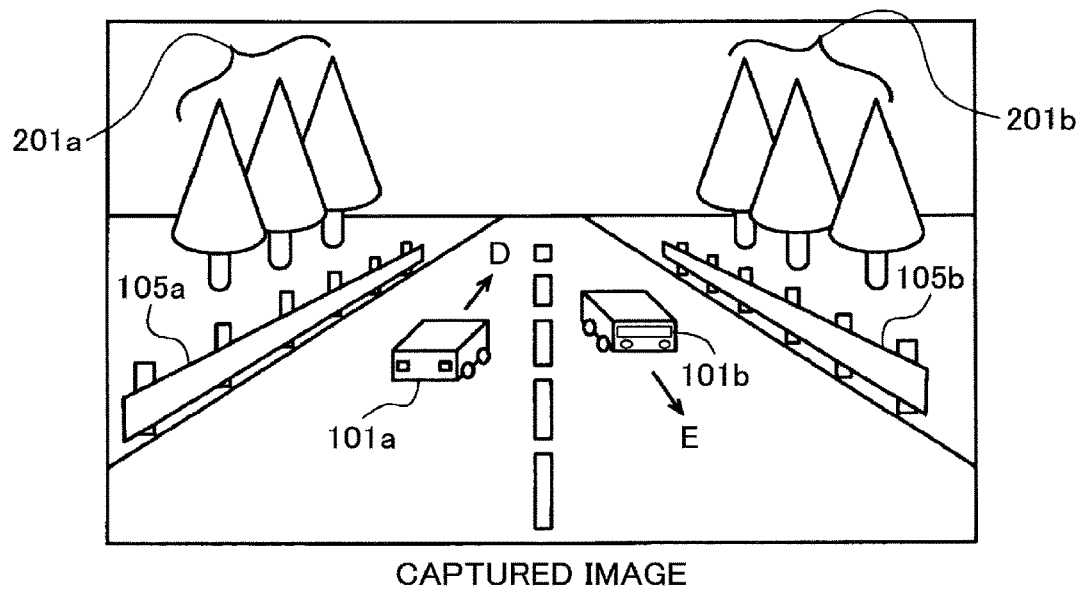
FIG. 10A is a schematic diagram for describing a problem of the related art.

Image processing according to the present embodiment will be described with reference to specific examples illustrated in FIGS. 7A and 7B. As a premise of the description, the problems of the related art will also be described with reference to specific examples illustrated in FIGS. 10A to 10C. FIG. 10A is drawn by adding trees 201a and 201b outside of the guard rails 105a and 105b of the captured image illustrated in FIG. 5A.

Figure 10B:
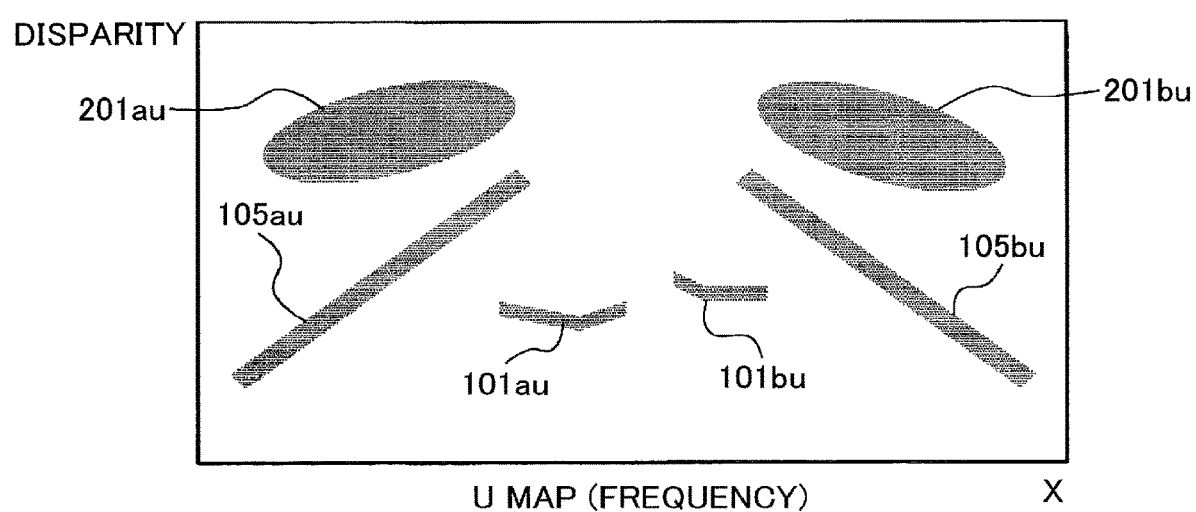
FIG. 10B is a schematic diagram for describing a problem of the related art.

FIG. 10B is a diagram illustrating a U map generated from a disparity image generated based on the captured image of FIG. 10A. In FIG. 10B, pixel regions 201au and 201bu corresponding to the trees 201a and 201b are displayed.

Figure 10C:
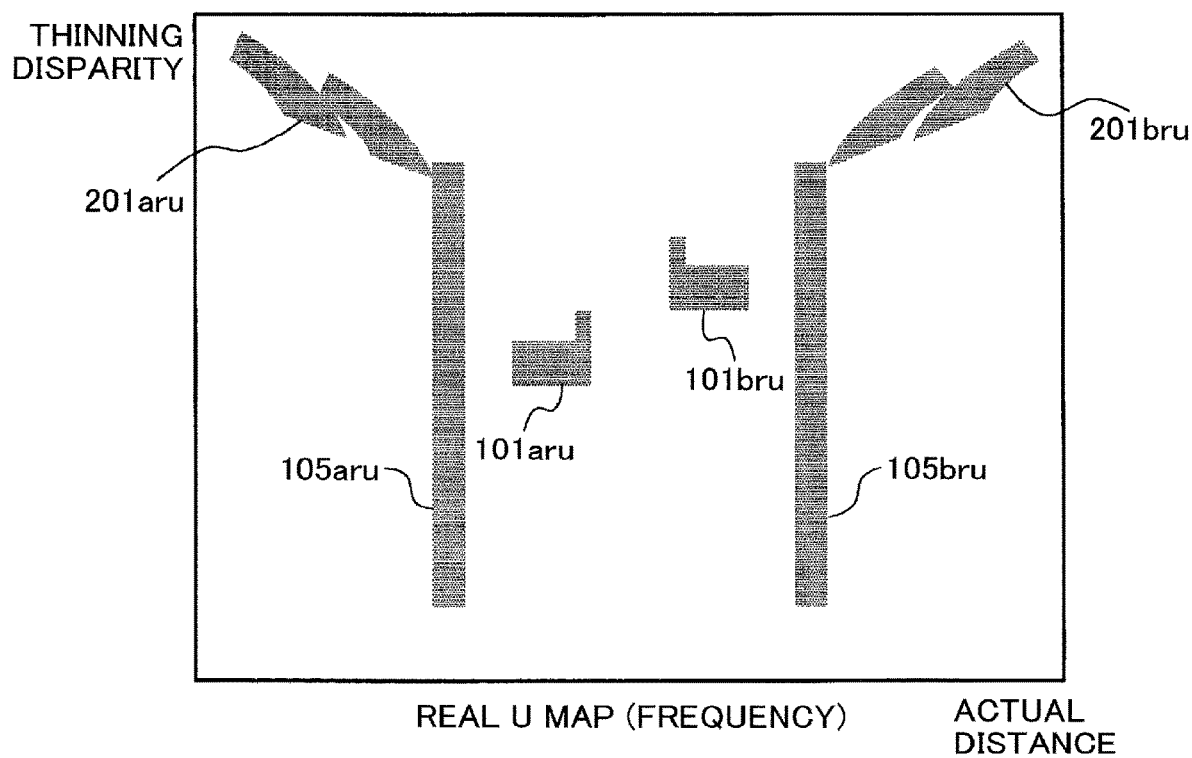
FIG. 10C is a schematic diagram for describing a problem of the related art.

FIG. 10C is a diagram illustrating a real U map converted from the U map of FIG. 10B. As illustrated in FIG. 10C, pixel regions 201aru and 201bru corresponding to the pixel regions 201au and 201bu in the U map, are displayed.

In the above description, in the related art, the pixel search is performed for all of the regions in the U map, and therefore the pixel regions 201au and 201bu corresponding to the trees 201a and 201b outside of the guard rails 105a and 105b are also the search targets. Information required by a vehicle traveling on a road is usually information with regard to other vehicles traveling ahead and people crossing a road, and information with regard to trees outside a guardrail is unnecessary, and therefore if trees, etc., are also included as search targets, the processing will take time accordingly.

Figure 7A:
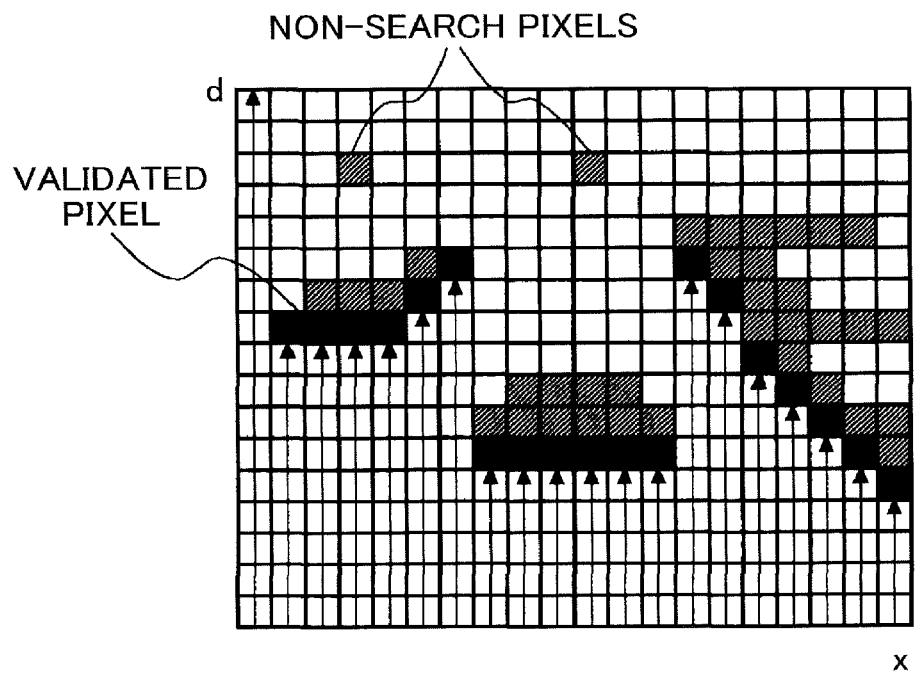
FIG. 7A is a schematic diagram for describing image processing according to an embodiment of the present invention.
Figure 7B:
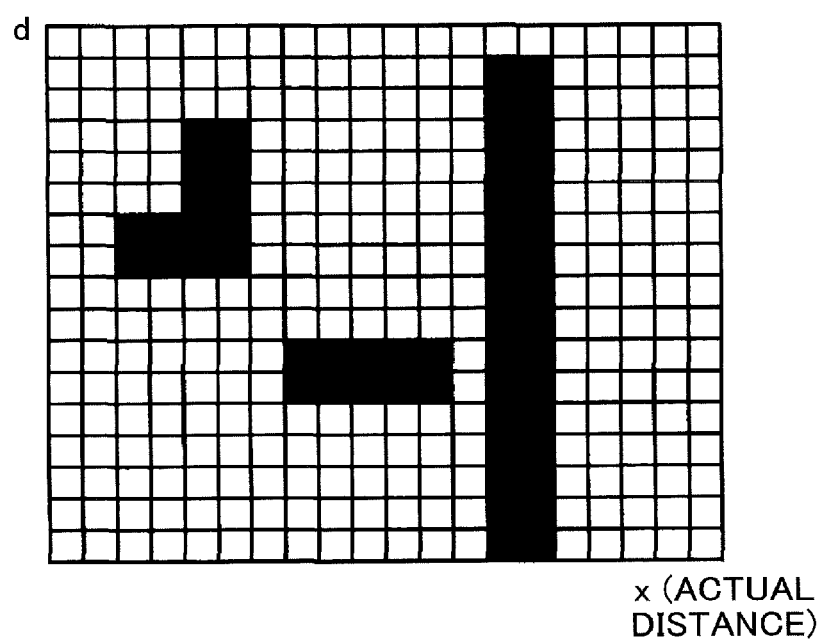
FIG. 7B is a schematic diagram for describing image processing according to an embodiment of the present invention.

Therefore, in the present embodiment, as illustrated in FIG. 7A, in order from the pixel row on the left side of the figure in the y axis direction in the U map, the searching unit 32 searches for the target pixel from the imaging viewpoint on the lower side of the figure toward the far distance direction on the upper side of the figure (see arrows). Then, when a target pixel satisfying the above-described predetermined condition is found (refer to a dark hatched portion), this is converted onto a real U map illustrated in FIG. 7B, and the validating unit 33 validates the pixels in the surrounding region of the converted pixel. Note that FIG. 7B illustrates the pixels after validation, but the pixels in FIG. 7B do not correspond to the pixels illustrated in FIG. 7A, and are merely illustrated as a matter of convenience.

In the present embodiment, by setting the pixels beyond the target pixel (see the thin hatching portions) as non-search pixels that are not to be search targets, the processing time can be reduced accordingly. Furthermore, the pixels beyond the target pixel are non-search pixels that are not to be searched for in the first place, and therefore these pixels will not be converted onto the real U map, and it is possible to reduce erroneous recognitions even when the processing result in a case of converting these pixels is used.

<Process of Changing Validation Range According to Present Embodiment>

Figure 8A:
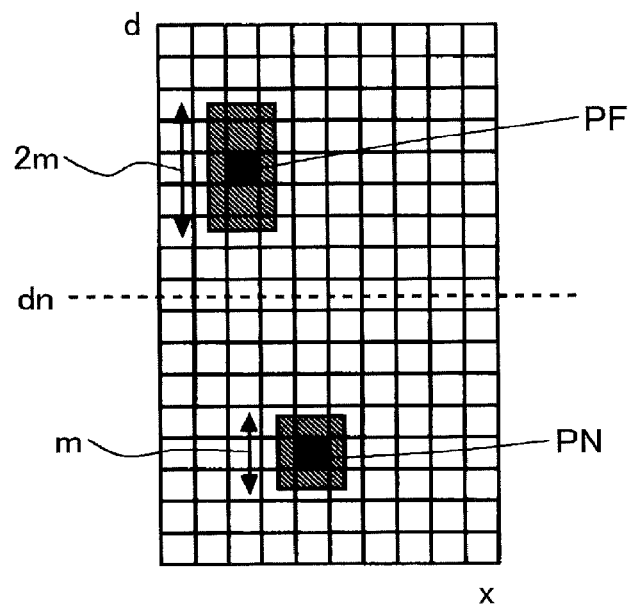
FIG. 8A is a schematic diagram for describing an example of a process of changing a validation range according to an embodiment of the present invention.
Figure 8B:
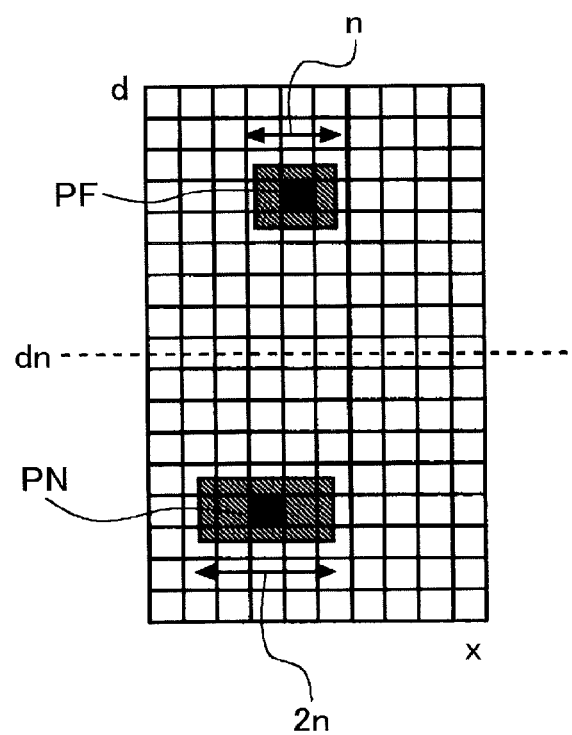
FIG. 8B is a schematic diagram for describing an example of a process of changing a validation range according to an embodiment of the present invention.

An example of a process of changing the validation range according to the present embodiment will be described with reference to FIGS. 8A and 8B. First, with respect to a target pixel PF in a long distance region from the imaging viewpoint, a process of enlarging the validation range to be larger than that of a target pixel PN in a short distance region, will be described with reference to FIG. 8A. In the present example, a line denoted by symbol dn is defined as a boundary line between a short distance and a long distance, as a matter of convenience. That is, the lower side (front side) than dn is the short distance region, and the upper side (back side) than dn is the long distance region.

With respect to the target pixel PN in the short distance region, a region corresponding to m % of the distance of the target pixel PN is set as the validation range. On the other hand, with respect to the target pixel PF in the long distance region, a region corresponding to 2 m % of the distance of the target pixel PF is set as the validation range. That is, the validation range of the target pixel PF in the long distance region is larger than the validation range of the target pixel PN in the short distance region. In the long distance region where the disparity is distributed and the pixels tend to stretch, the validation range is increased in the y axis direction to reduce erroneous recognitions, and in the short distance region where there are no concerns as in the long distance region, the validation range is reduced to increase the processing speed.

Next, with reference to FIG. 8B, a process for increasing the validation range of the target pixel PN in the short distance region from the imaging viewpoint, to be larger than the validation range of the target pixel PF in the long distance region, will be described. A line denoted by a symbol do is a boundary line between the short distance and the long distance, as in FIG. 8A.

With respect to the target pixel PF in the long distance region, a region corresponding to n % of the width of the target pixel PF is set as the validation range. On the other hand, with respect to the target pixel PN in the short distance region, a region corresponding to 2n % of the width of the target pixel PN is set as the validation range. That is, the validation range of the target pixel PN in the short distance region is larger than the validation range of the target pixel PF in the long distance region. In the short distance region where the disparity is subject to variability, by increasing the validation range in the x axis direction, erroneous recognitions can be reduced. In the long distance region, where there are no concerns as in the short distance region, by decreasing the validation range in the x axis direction, the processing speed can be increased.

<Processing Procedure According to Present Embodiment>

Figure 9:
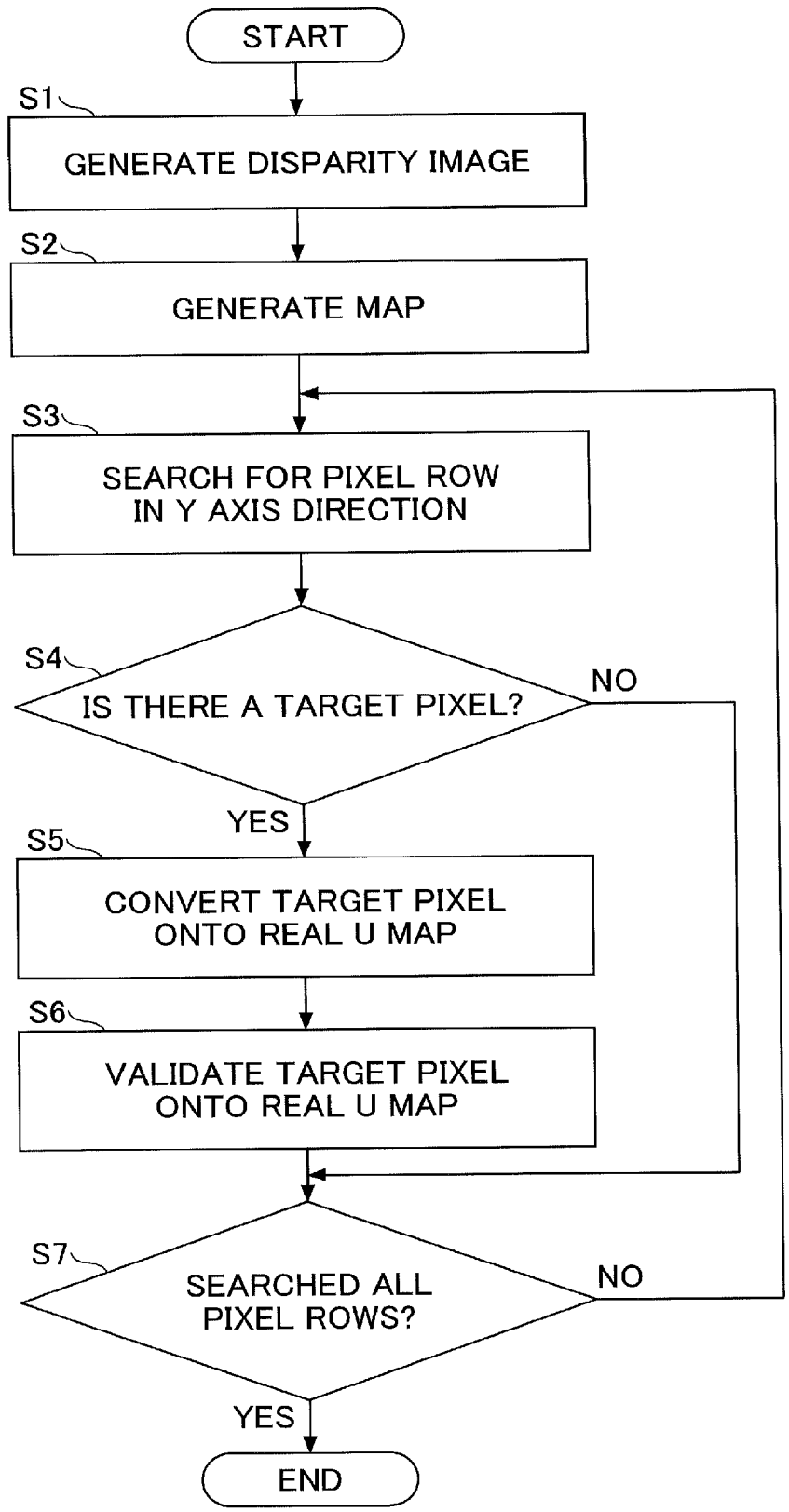
FIG. 9 is a flowchart illustrating a processing procedure according to an embodiment of the present invention.

The processing procedure according to the present embodiment will be described with reference to FIG. 9. First, the image processing apparatus 30 generates a disparity image from a captured image captured by the stereo camera 10 (step S1). Next, the first map generating unit 31 generates a V map and a U map based on the generated disparity image, and the second map generating unit 34 generates a real U map from the U map (step S2).

The searching unit 32 searches for a pixel row in the y axis direction in the generated U map (step S3). When a target pixel satisfying the above condition is found by the searching unit 32 (YES in step S4), the found target pixel is converted onto a real U map (step S5). Conversely, when a target pixel satisfying the above condition is not found by the searching unit 32 (NO in step S4), the image processing apparatus 30 determines whether all of the pixel rows have been searched (step S7). When all of the pixel rows have been searched by the image processing apparatus 30 (YES in step S7), the process is terminated, and when all of the pixel rows have not been searched by the image processing apparatus (NO in step S7), the next pixel row is searched (step S3).

On the other hand, when the validating unit 33 validates the target pixel that has been converted onto the real U map (step S6), the image processing apparatus 30 determines whether all of the pixel rows have been searched (step S7). When all of the pixel rows have been searched by the image processing apparatus 30 (YES in step S7), the process is terminated, and when all of the pixel rows have not been searched by the image processing apparatus 30 (NO in step S7), the next pixel row is searched (step S3).

Note that each of the above-described embodiments is a preferred embodiment of the present invention, and various modifications can be made without departing from the scope of the present invention. For example, each process by the above-described image processing apparatus according to the present embodiment can be executed using hardware, software, or a complex configuration including both.

Note that when executing a process using software, it is possible to install a program recording a processing sequence in a memory in a computer incorporated in exclusive-use hardware and execute the program. Alternatively, it is possible to install a program in a general-purpose computer capable of executing various processes, and execute the program.

Furthermore, in the above-described embodiment, a stereo camera is described as a premise; however, the present invention is not limited as such. For example, a distance image may be generated by combining distance information of a laser radar, etc., and a disparity image, and the image processing apparatus according to the present embodiment may be applied to the generated distance image.

According to one embodiment of the present invention, it is possible to increase the processing speed with respect to the recognition of an object, and to reduce erroneous recognitions of objects.

The image processing apparatus, the device control system, the imaging apparatus, the image processing method, and the recording medium are not limited to the specific embodiments described in the detailed description, and variations and modifications may be made without departing from the spirit and scope of the present invention.

What is claimed is:

1. An image processing apparatus, comprising:
processing circuitry configured to
generate a first map formed of pixels that are associated with x coordinate information, distance information, and frequency values;
search, row by row in the first map starting near the image processing apparatus and moving away from the image processing apparatus as indicated by the distance information, for a target pixel that satisfies a predetermined condition among the pixels in the first map, the predetermined condition including at least one of height information held by a searched pixel being greater than or equal to a predetermined threshold value and a pixel density of a surrounding region including the searched pixel being greater than or equal to a predetermined density threshold value;
validate pixels surrounding the target pixel in the first map, together with the target pixel; and
generate a second map obtained by converting an x axis direction of the first map into a unit corresponding to an actual distance, wherein
the processing circuitry validates, in the second map, the target pixel that has been converted onto the second map.

2. The image processing apparatus according to claim 1, wherein the processing circuitry validates pixels positioned within a first range in a direction according to the distance information from the target pixel.

3. The image processing apparatus according to claim 2, wherein the processing circuitry changes the first range according to the distance information of the target pixel.

4. The image processing apparatus according to claim 1, wherein the processing circuitry validates pixels positioned within a second range in the x axis direction from the target pixel converted onto the second map.

5. The image processing apparatus according to claim 4, wherein the processing circuitry enlarges the second range, in response to determining that the distance information of the target pixel is small.

6. An imaging apparatus, comprising:
two imagers; and
the image processing apparatus according to claim 1, wherein
the first map is generated from images captured by the two imagers.

7. A device control system, comprising:
processing circuitry configured to
generate a map formed of pixels that are associated with x coordinate information, distance information, and frequency values;
search, row by row in the map starting near the image processing apparatus and moving away from the image processing apparatus as indicated by the distance information, for a target pixel that satisfies a predetermined condition among the pixels in the map, the predetermined condition including at least one of height information held by a searched pixel being greater than or equal to a predetermined threshold value and a pixel density of a surrounding region including the searched pixel being greater than or equal to a predetermined density threshold value;
validate pixels surrounding the target pixel in the map, together with the target pixel;
generate a second map obtained by converting an x axis direction of the first map into a unit corresponding to an actual distance;
detect an object based on the validated pixels; and
control a predetermined device based on a result of the detection, wherein
the processing circuitry validates, in the second map, the target pixel that has been converted onto the second map.

8. A mobile body, comprising:
the device control system according to claim 7; and
the predetermined device, wherein
movement of the predetermined device is controlled by the processing circuitry of the device control system.

9. A non-transitory computer-readable recording medium storing a program that causes a computer to execute a process, the process comprising:
generating a map formed of pixels that are associated with x coordinate information, distance information, and frequency values;
searching, row by row in the neap starting near the image processing apparatus and moving away from the image processing apparatus as indicated by the distance information, for a target pixel that satisfies a predetermined condition among the pixels in the map, the predetermined condition including at least one of height information held by a searched pixel being greater than or equal to a predetermined threshold value and a pixel density of a surrounding region including the searched pixel being greater than or equal to a predetermined density threshold value;
validating pixels surrounding the target pixel in the map, together with the target pixel; and
generating a second map obtained by converting an x axis direction of the first map into a unit corresponding to an actual distance, wherein
the validating includes validating, in the second map, the target pixel that has been converted onto the second map.

* * * * *